(12) United States Patent
Childress et al.

(10) Patent No.: US 8,743,511 B2
(45) Date of Patent: Jun. 3, 2014

(54) CPP-GMR SENSOR WITH CORROSION RESISTENT SPACER LAYER AND HIGHER SIGNAL/NOISE RATIO

(75) Inventors: Jeffrey R. Childress, San Jose, CA (US); John C. Read, San Jose, CA (US); Neil Smith, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/222,827

(22) Filed: Aug. 31, 2011

(65) Prior Publication Data

US 2013/0052484 A1    Feb. 28, 2013

(51) Int. Cl.
G11B 5/39   (2006.01)

(52) U.S. Cl.
USPC ........................................ 360/324.2; 360/324

(58) Field of Classification Search
USPC ................................. 360/324.2, 324
See application file for complete search history.

(56) References Cited

U.S. PATENT DOCUMENTS

| | | | |
|---|---|---|---|
| 5,000,779 A * | 3/1991 | German et al. | 75/244 |
| 5,491,600 A * | 2/1996 | Chen et al. | 360/322 |
| 5,793,279 A * | 8/1998 | Nepela | 338/32 R |
| 5,903,708 A | 5/1999 | Kano et al. | |
| 6,686,068 B2 * | 2/2004 | Carey et al. | 428/811.3 |
| 6,828,897 B1 * | 12/2004 | Nepela | 338/32 R |
| 6,876,522 B2 | 4/2005 | Ambrose et al. | |
| 6,982,854 B2 * | 1/2006 | Kawawake et al. | 360/324.1 |
| 7,268,984 B2 | 9/2007 | Hasegawa et al. | |
| 7,525,772 B2 | 4/2009 | Koui et al. | |
| 7,558,028 B2 * | 7/2009 | Carey et al. | 360/324.12 |
| 2003/0146459 A1 | 8/2003 | Katti et al. | |
| 2010/0188771 A1 | 7/2010 | Okamura et al. | |

FOREIGN PATENT DOCUMENTS

JP    6200364 A    7/1994

OTHER PUBLICATIONS

Fukuzawa et al., Nanoconstricted structure for current-confined path in current-perpendicular-to-plane spin valves with high magnetoresistance, Presented on Nov. 10, 2004; published online May 4, 2005, Journal of Applied Physics, 97, 10C509.*

Zeng et al., Numerical failure analysis of current-confined-path current perpendicular-to-plane giant magnetoresistance spin-valve read sensors under high current density, Received Jul. 8, 2010; accepted Dec. 2, 2010; published online Feb. 1, 2011, Journal of Applied Physics, 109, 033901.*

(Continued)

*Primary Examiner* — Wayne Young
*Assistant Examiner* — Carlos E Garcia
(74) *Attorney, Agent, or Firm* — Patterson & Sheridan, LLP

(57) ABSTRACT

A method and apparatus for increasing the electrical resistivity and corrosion resistance of the material forming a spacer layer in current-perpendicular-to-the-plane (CPP) giant magnetoresistive (GMR) sensors. The increased resistivity of the spacer layer, and thus, the CPP-GMR sensor permits a larger voltage across the sensor and a higher signal-to-noise ratio. The increased corrosion resistance of the spacer layer minimizes the effects of exposing the spacer layer to corrosive materials during fabrication. For example, adding tin to silver to form a metallic alloy spacer layer increases the corrosion resistance of the spacer layer and the electrical resisitivity of the CPP-GMR sensor relative to a spacer layer consisting solely of silver. The Ag—Sn alloy permits a larger current to flow through the sensor, which increases the signal-to-noise ratio.

6 Claims, 9 Drawing Sheets

(56) References Cited

OTHER PUBLICATIONS

Iwase, Taku et al., Large Interface Spin-Asymmetry and Magnetoresistance in Fully Epitaxial CO2MnSi/Ag/CO2MnSi Current-Perpendicular-to-Plane Magnetoresistive Devices, Applied Physics Express, 2009, vol. 2, No. 063003, Japan.

Pratt, W.P. et al., Giant magnetoresistance with current perpendicular to the layer planes of Ag/Co and AgSn/Co miltilayers (invited), Journal of Applied Physics, May 15, 1993, pp. 5326-5331, vol. 73, No. 10, Journal of Applied Physics, Argonne, Illinois, United States.

Lee, S.-F. et al., Two-channel analysis of CPP-MR data for Ag/Co and AgSn/Co multilayers, Journal of Magnetism and Magnetic Materials, 1992, Elsevier Science Publishers, Amsterdam, Netherlands.

Furubayashi, T. et al., Structure and transport properties of current-perpendicular-to-plane spin valves using Co2FeAI0.5Si0.5 and CO2MnSi Heusler alloy electrodes, Journal of Applied Physics, 2010, vol. 107, No. 113917, Argonne, Illinois, United States.

Fowler, Q. et al., Spin-diffusion lengths in dilute Cu(Ge) and Ag(Sn) alloys, Journal of Magnetism and Magnetic Materials, 2009, pp. 99-101, Elsevier Science Publishers, Amsterdam, Netherlands.

Bass, J. et al., Studying spin-dependent scattering in magnetic multilayers by means of perpendicular (CPP) magnetoresistance measurements, Materials Science and Engineering, 1995, pp. 77-83, Elsevier Science Publishers, Amsterdam, Netherlands.

\* cited by examiner

CPP-GMR SENSOR WITH CORROSION RESISTENT SPACER LAYER AND HIGHER SIGNAL/NOISE RATIO

BACKGROUND OF THE INVENTION

1. Field of the Invention

Embodiments of the present invention generally relate to giant magnetoresistive (GMR) sensors. More particularly, the invention relates to current-perpendicular-to the-plane (CPP) magnetoresistive sensors.

2. Description of the Related Art

Magnetic read heads in modern magnetic disk drives operate on the basis of the tunneling magnetoresistive (TMR) effect in which a component of the read element resistance varies as the cosine of the angle between the magnetization in free and reference magnetic layers which sandwich an insulating tunnel barrier layer. Recorded data can be read from a magnetic medium because the external magnetic field from the recorded magnetic medium (i.e., the signal field) causes a change in the direction of magnetization in the free layer, which in turn causes a change in resistance across the tunnel barrier in the TMR and a corresponding change in the sensing electrical current or voltage. As read head sizes scale down to accommodate increasing areal storage densities, the device resistance of TMR read heads is projected to increase beyond levels that are easily accommodated using standard detection electronics.

A GMR sensor is an alternative to a TMR read head. A GMR read head has a resistance that varies according to the angle between the free and reference magnetic layers. Further, a GMR read head uses a sense CPP of these magnetic layers. CPP-GMR sensors primarily differ in structure from TMR read heads in that the high resistance tunnel barrier layer is replaced by a low resistance metallic spacer. Accordingly, the resistance of a CPP-GMR sensor is primarily determined by stack structure of the free layer, the reference layer, and the low resistance metallic space. Rather than spin-dependent tunneling of electrons across a barrier layer as used in a TMR sensor, the CPP-GMR sensor uses spin-dependent scattering of the conduction electrons at both the interface between the magnetic and spacer layers as well as in the magnetic layers themselves. For a given cross-section area, the device resistance of a CPP-GMR sensor will be 10-20 times smaller than for a TMR sensor.

Because of the much lower device resistance, CPP-GMR sensors operate at much higher sense current densities if the bias voltage applied is comparable to that used in TMR sensors (e.g., 100 mV). At these higher current densities, the output signal and signal/noise ratio for a CPP-GMR sensor is limited by spin-torque effects, which originate from the torque induced on either the free or reference magnetic layers by the spin-polarized electron current density applied during operation. If too large, the spin-torque can introduce oscillatory instability of the magnetization in either the free or reference layers. Accordingly, reducing the susceptibility of a CPP-GMR read sensor to spin-torque induced instability improves its performance in magnetic recording applications.

Moreover, during processing of a read head, a CPP-GMR sensor may be subjected to lapping or chemical mechanical polishing/planarization (CMP) during which exposed layers may begin to corrode. The metallic spacer layer may be particularly susceptible to oxidizing during this process. For example, common spacer layer materials are known to easily corrode or tarnish. During a mechanical lapping process to form the air bearing surface (ABS), these materials may oxidize and hamper the electrical current flowing between the different layers of the CPP-GMR sensor.

SUMMARY OF THE INVENTION

One embodiment of the present invention provides a read head sensor that includes a first magnetic layer and a second magnetic layer with a spacer layer deposited in between. The spacer layer comprises an alloy, of which at least one metal of the alloy is electrically conductive. Further, the spacer layer is (i) more resistant to corrosion and (ii) increases the electrical resistivity of the read head sensor relative to a spacer layer consisting entirely of the at least one metal.

One embodiment of the present invention provides a read head sensor that includes a first magnetic layer and a second magnetic layer with a spacer layer disposed in between. The spacer layer comprises a silver alloy.

Another embodiment of the present invention provides a method of fabricating a read head sensor. The method includes depositing a first magnetic layer onto a substrate. The method also includes depositing a spacer layer above the first magnetic layer. The spacer layer comprises a metallic alloy, of which at least one metal in the alloy is electrically conductive. Further, the spacer layer is (i) more resistant to corrosion and (ii) increases the electrical resistivity of the read head sensor, relative to a spacer layer consisting entirely of the at least one metal. The method includes depositing a second magnetic layer above the spacer layer.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

The present invention relates to increasing the electrical resistivity and corrosion resistance of the material forming a spacer layer in CPP-GMR sensors. The increased resisitivty of the spacer layer, and thus, the CPP-GMR sensor, permits a larger voltage across the sensor and a higher signal-to-noise ratio. The increased corrosion resistance of the spacer layer minimizes the effects of exposing the spacer layer to corrosive materials during fabrication.

An Exemplary Hard Drive

Figure 1:
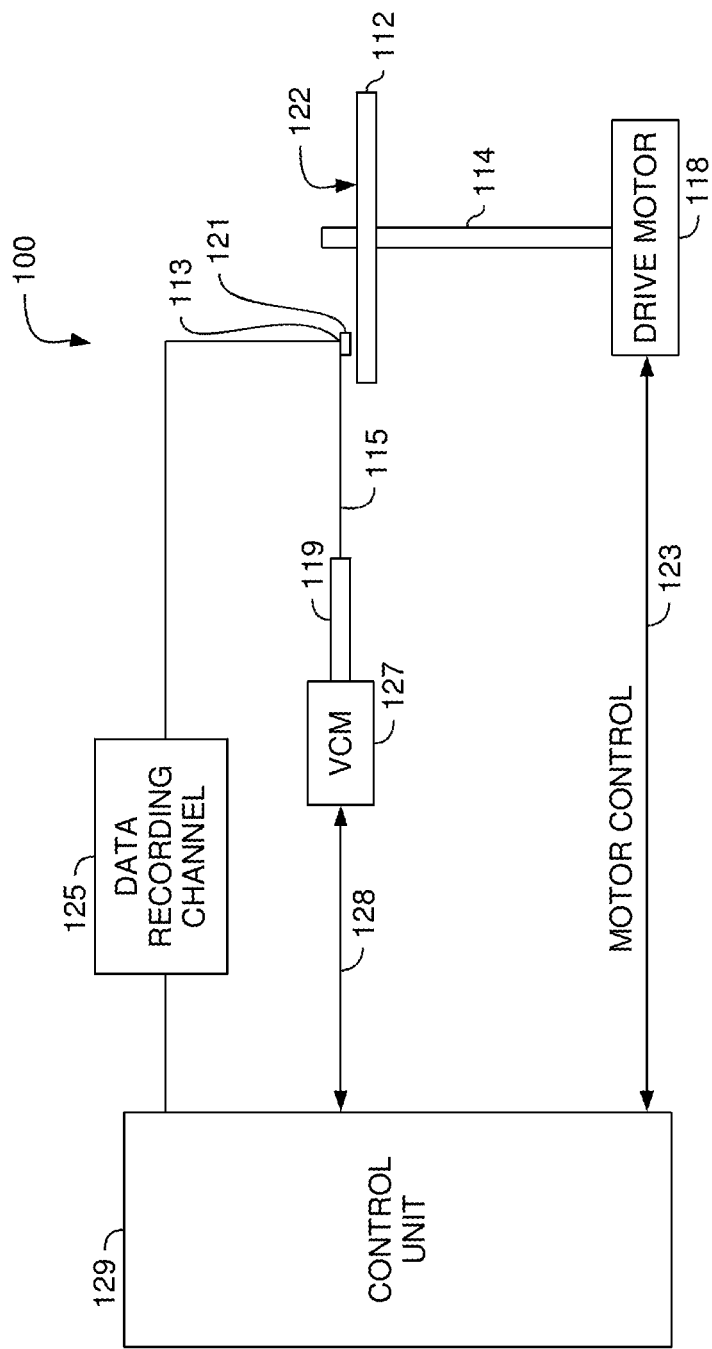
FIG. 1 illustrates a disk drive, according to embodiments of the invention.

FIG. 1 illustrates a disk drive 100 embodying this invention. As shown, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112. Each slider 113 supports one or more magnetic head assemblies 121 for reading from and writing to the disk surface 122. As the magnetic disk rotates, the slider 113 moves radially in and out over the disk surface 122 so that the magnetic head assembly 121 may access different tracks of the magnetic disk where desired data is written. The magnetic head assembly 121 may comprise of at least a write head portion and read head portion for writing data to and reading data from the magnetic disk surface 122. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by control unit 129.

The rotation of the magnetic disk 112 generates the ABS between the slider 113 and the disk surface 122 which exerts an upward force or lift on the slider 113. The ABS thus counter-balances the slight spring force of suspension 115 and supports slider 113 off and slightly above the disk 112 surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

The above description of a typical magnetic disk storage system and the accompanying illustration of FIG. 1 are for representation purposes only. It should be apparent that disk storage systems may contain a large number of disks and actuators, and each actuator may support a number of sliders.

Layers of a GMR Sensor

Figure 2:
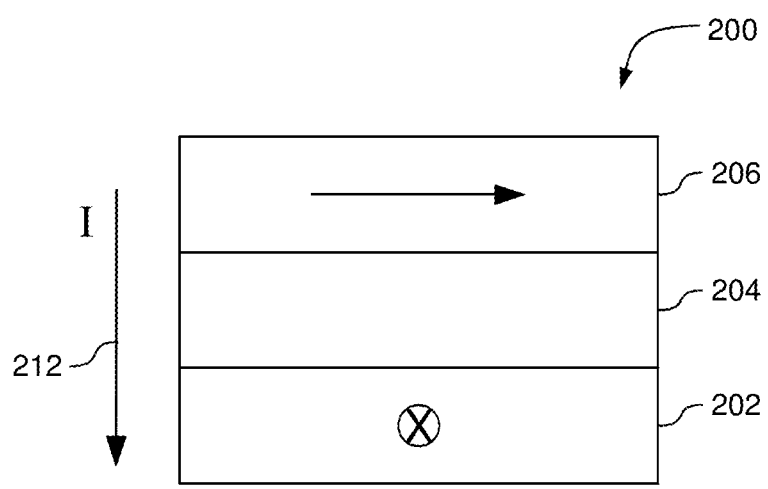
FIG. 2 shows a cross-sectional schematic diagram of a portion of a read head sensor, according to embodiments of the invention.

CPP spin valves or pseudo spin valves may be a portion of a read head located in the magnetic head assembly 121 discussed above. These spin valves are oriented so that the bias current that is applied to the GMR films is perpendicular to the plane of the films. FIG. 2 shows a cross-sectional schematic diagram of a portion of a CPP spin valve or pseudo spin valve. As shown, GMR sensor 200 includes a ferromagnetic free layer 206, a ferromagnetic reference layer 202, and a spacer layer 204 disposed between the ferromagnetic free layer 206 and the ferromagnetic reference layer 202. A sensing electrical current 212 is perpendicular to the plane of the GMR sensor 200 (i.e., current flows vertically within the stack). The default orientations or directions for the magnetizations of the ferromagnetic free layer 206 and the ferromagnetic reference layer 202 are indicated. A "default" orientation is the direction of the magnetization of a ferromagnetic layer without the influence of a magnetic field external to the read head.

The spacer layer 204 is typically made of a conductive material such as a metal or metallic alloy. As referred to herein, a metallic alloy is a mixture of elements into a solid, metallic matrix that contains at least one metal element. In one embodiment, The ABS of the GMR sensor 200 may be the surface shown. That is, FIG. 2 illustrates the GMR sensor 200 from the perspective of the disk surface 122.

As the GMR sensor 200 in the magnetic head assembly 121 flies over the magnetic media, the magnetization of the media deflects the magnetization of the ferromagnetic free layer 206. The electrical resistance of the GMR sensor 200 varies with the relative angle between the electrode magnetizations. As the magnetic head assembly 121 flies over the media 112, the magnetization of the free layer 206 is influenced by the magnetic field variations from the bits stored in the media 112. A transition from a bit with an out of plane magnetization to another bit with an in plane magnetization will be read as a change in device resistance while a transition between two bits with like magnetization orientations is read as no change in device resistance. The direction of the magnetizations of the ferromagnetic free layer 206 and the ferromagnetic reference layer 202 are approximately 90 degrees apart in the default state (i.e., when the magnetization of the ferromagnetic free layer 206 is unaffected by the magnetic fields on the media 112). As the magnetization orientation of the free layer 206 and the reference layer 202 become more parallel, the resistance of the GMR sensor 200 decreases. Conversely, as the orientation of the layers 206, 202 become more anti-parallel, the resistance of the GMR sensor 200 increases.

The ferromagnetic free layer 206 and the ferromagnetic reference layer 202 may comprise of any magnetic material or a plurality of layers that performs the functions described herein. In one embodiment, the ferromagnetic free layer 206 and the ferromagnetic reference layer 202 comprise alloys of Co, Fe and Ni. In another embodiment, the ferromagnetic free layer 206 and the ferromagnetic reference layer 202 comprise alloys of Co, Fe, Ni with up to 35 atomic percent of Ge, Ga, Si or Al. In another embodiment the ferromagnetic free layer 206 and the ferromagnetic reference layer 202 comprise of a ferromagnetic Heusler alloy. Generally, Heusler alloys have a large spin polarization that affects the spin orientation of the conducting electrons leaving the alloys. Specifically, depending on the Heusler alloy, the majority of electrons in the conduction band either have primarily spin-up orientations or spin-down orientations for their associated magnetization. A high density of conducting electrons with a particular spin increases the attainable signal-to-noise ratio of the GMR sensor 200.

A non-exhaustive list of typical ferromagnetic Heusler alloys includes $Co_2MnAl$, $Co_2MnSi$, $Co_2FeSi$, $Co_2MnGa$, $Co_2MnGe$, $Co_2FeAl$, and $Co_2FeGe$. Alloys such as $Co_2Fe(Al_{100-x}Si_x)$ are also Heusler alloys with high spin-polarization characteristics.

In one embodiment, the thickness of each of the ferromagnetic free layer 206 and the ferromagnetic reference layer 202 ranges from 15-100 Å.

In one embodiment, the spacer layer 204 comprises electrically conductive materials; for example, the spacer layer 204 may comprise either silver (Ag) or copper (Cu). Both of these metals have FCC crystalline structures that are compatible with the growth of Heusler alloys—i.e., the crystalline properties of Ag and Cu substantially match the crystalline properties of Heusler alloys. Additionally, both of these metals have long spin diffusion lengths—i.e., transmitted electrons retain their spin orientation over distances greater than the typical thickness (e.g., 20-50 Å) of a spacer layer.

The spin diffusion length measures the effective transport of spin-polarized currents. As mentioned previously, Heusler alloys produce a high density of conduction electrons that have a particular spin orientation—i.e., the Heusler alloys polarize the electrons with a certain spin. To better measure the magnetic orientation of the magnetic media, the spin polarization of the conduction electrons should be maintained when the electrons move through the spacer layer 204.

The spacer layer 204 needs to be thick enough to prevent magnetic (or exchange) coupling between the ferromagnetic free layer 206 and the ferromagnetic reference layer 202, but thinner than the spin diffusion length of the material. Both Ag and Cu satisfy these specifications. Specifically, Ag and Cu have spin diffusion lengths of a 1000 Å or greater.

Corrosion of the Spacer Layer

In typical processing of a magnetic read head, the GMR sensor 200 is subjected to CMP. At one step, a wafer containing multiple GMR sensors 200 is placed in a liquid slurry and polished by an abrasive disk to form the ABS. This lapping process exposes the spacer layer 204 to potentially corrosive materials.

Ag and Cu are known to be susceptible to corrosion—e.g., the metals oxidize or tarnish easily. Although these metals provide long spin diffusion lengths and prevent magnetically coupling, they may corrode during fabrication.

In one embodiment, tin (Sn) and Ag may be combined to form a metallic alloy to serve as the spacer layer 204. Advantageously, an alloy of Ag—Sn increases the ability of the spacer layer 204 to avoid corroding relative to a spacer layer comprising entirely of silver. Therefore, the Ag—Sn alloy spacer layer 204 is more robust during the sensor fabrication process. A non-exhaustive list of Ag—Sn alloys includes $AgSn_3$, $AgSn_6$, $AgSn_{10}$, $AgSn_{13}$, and $AgSn_{16}$ where the indices indicate atomic concentration (%) of Sn. In one embodiment, the atomic percent of the Sn in the Ag—Sn alloy is 2-20%.

Figure 3:
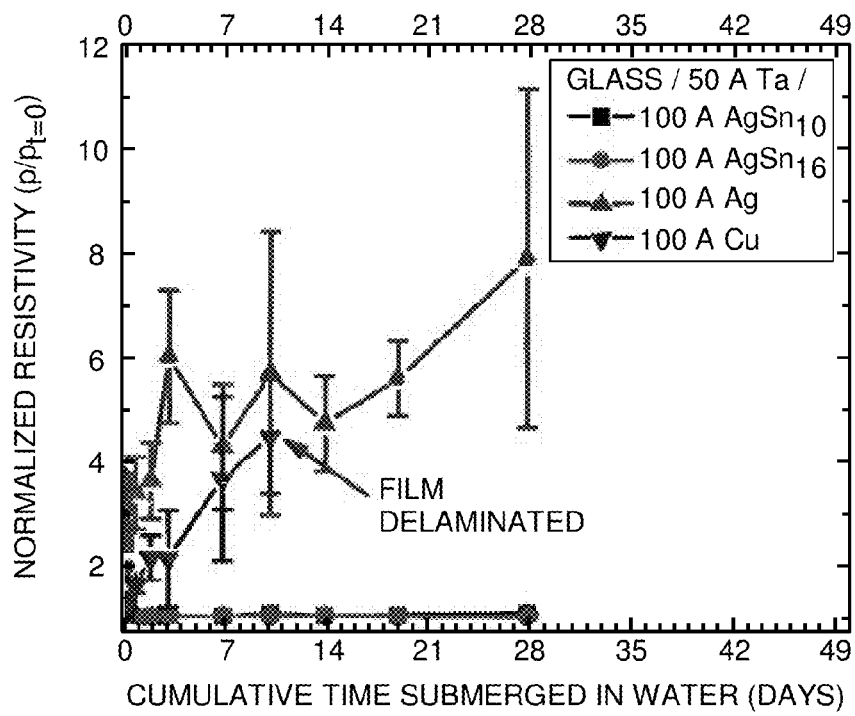
FIG. 3 is a graph illustrating the normalized resistivity of materials used in a spacer layer of a read head sensor, according to embodiments of the invention.

FIG. 3 is a graph illustrating the normalized resistivity of Ag, Cu, and Ag—Sn alloys. FIG. 3 measures the normalized resistivity of the listed materials by the number of days the materials are submerged in water (i.e., a corrosive material). As shown, the resistivity of the Ag and Cu begins to increase once exposed to the corrosive material. The Ag—Sn alloys, however, maintain the same resistivity. A corroded spacer layer 204 degrades signals and harms the signal-to-noise ratio of a GMR sensor 200.

Figure 4:
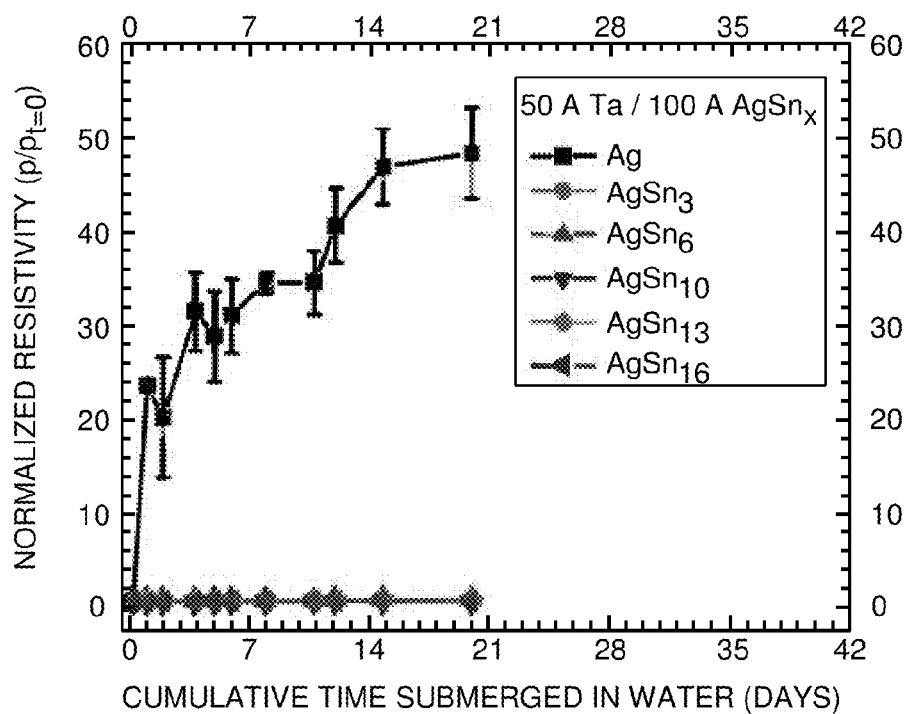
FIG. 4 is a graph illustrating the normalized resistivity of materials used in a spacer layer of a read head sensor, according to embodiments of the invention.

FIG. 4 is a graph illustrating the normalized resistivity of Ag and Ag—Sn alloys. FIG. 4 measures the normalized resistivity of the listed materials relative to the number of days the materials are submerged in water. The resistivity of the pure silver quickly begins to rise indicating that the silver is corroding or tarnishing. The resistivity of the Ag—Sn alloys, however, remains constant. That is, the addition of Sn negates the tendency of Ag to corrode.

In one embodiment, germanium (Ge) and Cu may be combined to form a metallic alloy to serve as the spacer layer 204. Advantageously, an alloy of Cu—Ge increases the ability of the spacer layer 204 to avoid corroding. The atomic percent of the Ge in the Cu—Ge alloy may be 5-20%.

In general, any metallic alloy may be used as the spacer layer 204 so long as the ability of the spacer layer to avoid corroding is increased relative to a spacer layer consisting of only one of the metals in the metallic alloy, and as long as the spacer layer 204 and its interfaces to the magnetic layers 202, 206 do not excessively reduce the magnetoresistance effect in the spin-valve due to a short spin diffusion length or interfacial spin scattering.

Increasing the Resistivity of the Spacer Layer

The signal-to-noise ratio of CPP-GMR read sensors is limited by spin-torque induced excitation and noise resulting from the high electron current density when using sufficiently large bias voltages. This spin-torque excitation happens primarily at the interface between the ferromagnetic layers 202, 206 and the spacer layer 204. Although spacer layers 204 comprising Ag have recently been found to be particularly well suited for obtaining high CPP-GMR signals due to a favorable interface with ferromagnetic layers 202, 206 comprising Heusler alloys, the spin-torque excitation still limits the potential difference and the resulting current that may be applied to the GMR sensor 200.

A large spin-torque may introduce magnetic noise and oscillatory instability of the magnetization in either or both of the ferromagnetic layers 202, 206. This instability increases when the magnetizations of the reference and free layers 202, 206 approach the anti-parallel orientation. In other words, the critical current density for the onset of instability when in the anti-parallel configuration ($J_{crit-AP}$) is significantly smaller than the current density for the parallel orientation ($J_{crit-P}$). It has been experimentally verified for conventional spacers of Cu or Ag that $J_{crit-P}/J_{crit-AP}$, is typically in the range of 2-4. Thus, for practical device operation, it is $J_{crit-AP}$ which limits sensor performance. To avoid the excessive noise or instability, stable operation requires maintaining the density of the sense current 212 (as measured by the length and cross-sectional area of the GMR sensor 200) below a critical value. If ΔRA is the maximum magnetoresistive change of the resistance-area product of the GMR sensor 200 stack, then $J_{crit-AP} \times \Delta RA$ represents the maximum voltage signal obtainable from the CPP-GMR sensor. Decreasing the maximum signal voltage concomitantly reduces the signal/noise ratio of the GMR sensor 200, making it more likely that a smaller signal is masked by the noise.

The spin-torque magnitude is measured by a spin-torque transfer efficiency $\eta(\theta)$, where $\theta$ is the angle between the magnetizations of free and reference layers 202, 206. At a given angle $\theta$, the critical current $J_{crit}(\theta)$ is inversely proportional to $\eta(\theta)$. In particular, $J_{crit}(\theta \approx 180°) \approx J_{crit-AP}$ is proportional to $1/\eta_{AP}$, where $\eta_{AP} = \eta(\theta=180°)$. It follows that $J_{crit-AP} \times \Delta RA$ scales with $(\Delta RA/\eta_{AP})$.

Based on diffusive transport theory for metallic multilayer stacks resembling those used in CPP-GMR sensors, the role of the spacer layer in controlling the value of $(\Delta RA/\eta_{AP})$ is may be described by:

$$\frac{\Delta RA}{\eta_{AP}} \propto \beta \left[ \frac{1}{g^{\uparrow\downarrow}_{FM-NM}} + \frac{1}{2}(\rho t)_{NM} \right] \quad (1)$$

The mixing conductance ($g^{\uparrow\downarrow}$) is expected to be similar to the Sharvin conductance of the spacer material, and in general, is similar to typical choices of metallic spacers. The inverse mixing conductance ($1/g^{\uparrow\downarrow}$) is approximately 0.5-1 m$\Omega$-$\mu m^2$. In the second term, $\rho t$ is the resistivity-thickness product for the spacer layer 204, which may be increased by the choice of metallic spacer. Doing so may concomitantly increase ($\Delta RA/\eta_{AP}$). For a typical spacer thickness (t) of 40 Å, Cu or Ag spacer layers 204 with a resistivity ($\rho$) of approximately 0.03 $\Omega$-$\mu m$ yield a $\frac{1}{2}$ $(\rho t)_{NM}$ of approximately 0.06 m$\Omega$-$\mu m^2$. However, this value is dwarfed by the $1/g^{\uparrow\downarrow}_{FM-NM}$ term of equation 1 which is typically an order of magnitude larger.

Figure 5A:
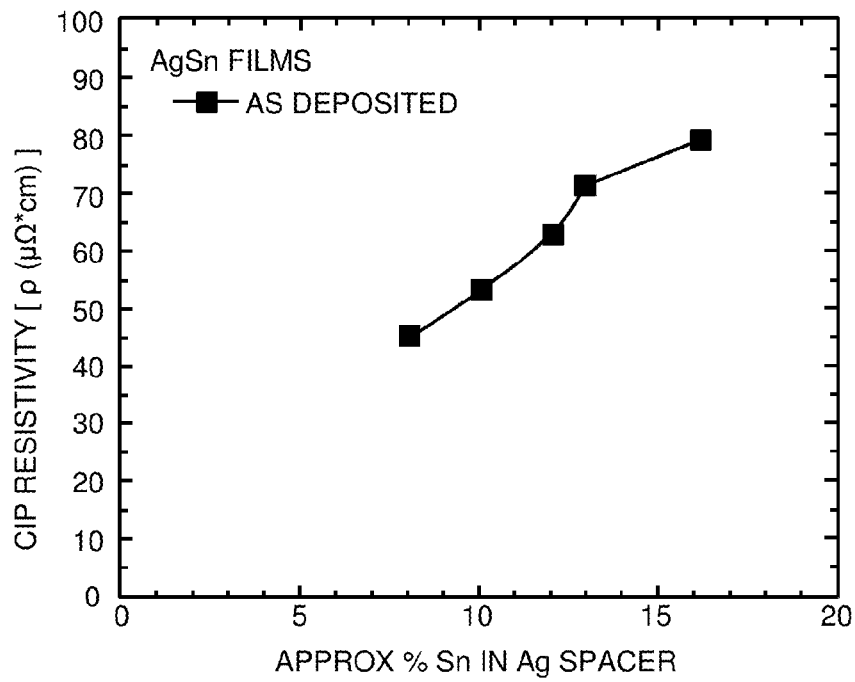
FIGS. 5A-B are graphs illustrating the characteristics of materials used in a spacer layer of a read head sensor, according to embodiments of the invention.
Figure 5B:
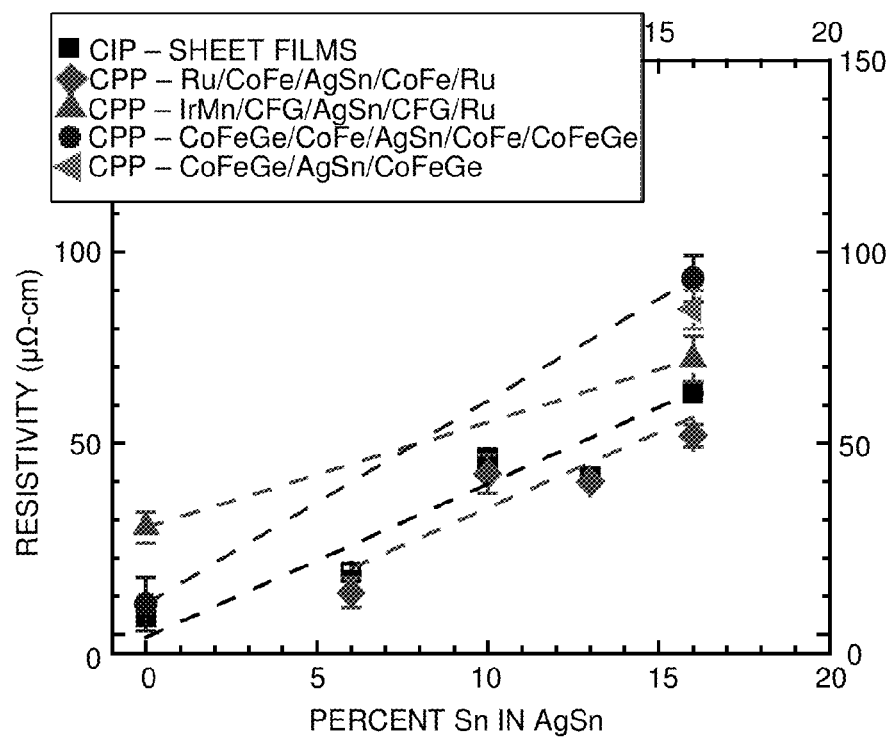

FIGS. 5A-B are a graphs illustrating the resistivity $\rho$ ($\mu\Omega$-cm) for different Ag—Sn alloys. FIG. 5A illustrates that the atomic percent of Sn in the Ag—Sn alloy is varied from 8-17%. As shown, the resistivity p ranges from 40-80 $\mu\Omega$-cm and yields a factor of 10-20 increase in the resistivity ($\rho_{Ag-Sn}$) of Ag—Sn over the resistivity ($\rho_{Ag}$) of only Ag. Adding the respective amounts of Sn therefore makes the resistivity of the Ag—Sn alloy similar to the $1/g^{\uparrow\downarrow}_{FM-NM}$ term of equation 1. Accordingly, using a Ag—Sn alloy for the spacer layer substantially increases $\frac{1}{2}(\rho t)_{NM}$ and the value of $\Delta RA/\eta_{AP}$ to permit a higher $J^{crit}$. In generally, the resistivity of the Ag—Sn alloy is greater than 10 $\mu\Omega$-cm.

FIG. 5B illustrates resistivity measurements from thin-films and from GMR sensor structures. FIG. 5B illustrates that Ag—Sn films have greater resistivity—ranging from 50-100 $\mu\Omega$-cm—than films that include only Ag in both thin-films and GMR sensors.

However, intrinsic magnetoresistive change ($\Delta RA$) approximately scales exponentially with spacer thickness ($\Delta RA \propto \exp(-t/l_{sd})$). Even in the absence of spin-torque instability, there are other noise sources which require a sufficient signal level in order to achieve an adequate signal to noise ratio. Thus, the Ag—Sn alloy should also have a spin diffusion length ($l_{sd}$) that is preferably 5 to 10 times greater than the chosen spacer layer 204 thickness (t) to avoid significant loss due to a drop in $\Delta RA$ cause by spin-depolarization of the conduction electrons passing through the spacer layer 204. Also, the thickness of a spacer layer 204 should be greater than a minimum value—e.g., 2 nm—to prevent magnetic coupling between the ferromagnetic layers 202, 206. Thus, while other impurities besides Sn may be added to Ag to improve resistivity, those elements may significantly lower the spin diffusion length of the spacer layer 204 to the point of unacceptable loss of the $\Delta RA$. This deleterious effect may counter the gain of increasing the value of $\Delta RA/\eta_{AP}$. Ag—Sn and Cu—Ge alloys, however, satisfy both conditions.

The spin diffusion length of the spacer layer material should be greater than the thickness of the spacer layer 204 to maintain the maximum $\Delta RA$ of the GMR sensor 200 stack. However, even if adding Sn to Ag decreased the spin diffusion length from thousands of angstroms to only hundreds of angstroms, this decrease would not significantly affect the $\Delta RA$. Accordingly, adding the small amounts of Sn (less than 20%) to Ag may increase the $\Delta RA/\eta_{AP}$ without decreasing the spin diffusion length of the spacer layer 204 to the point that it significantly decreases the $\Delta RA$ of the GMR sensor 200 stack.

Figure 6A:
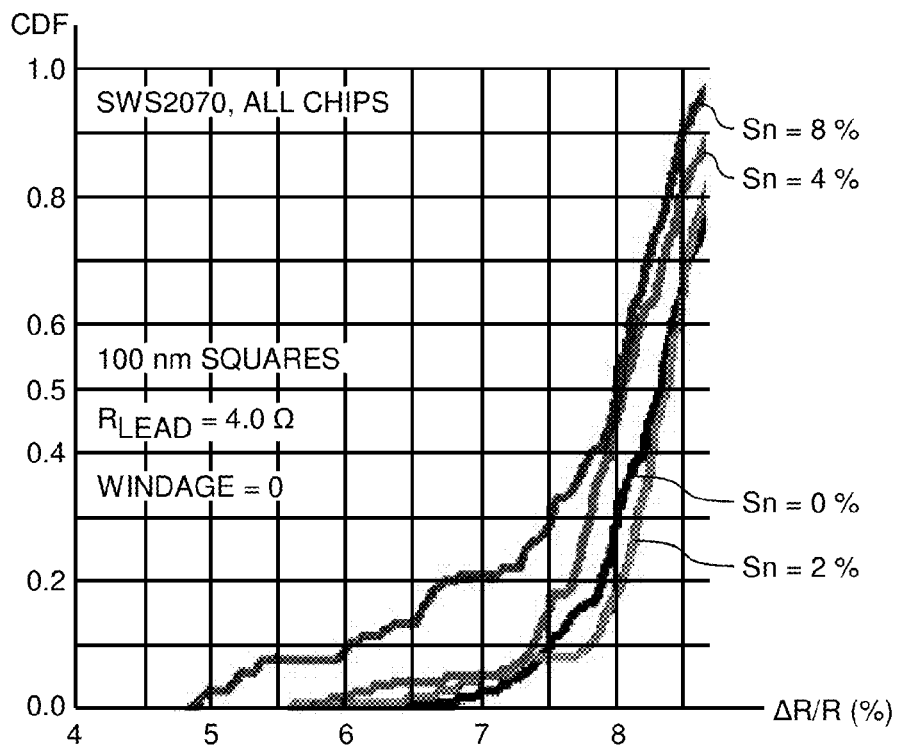
FIGS. 6A-D are a graphs showing the characteristics of materials used in a spacer layer of a read head sensor, according to embodiments of the invention.

FIG. 6A is a graph showing the $\Delta RA$ for alloys of Ag—Sn with varying concentrations of Sn. Up to 8% of Sn in the Ag—Sn alloy has a $\Delta RA$ that is substantially similar to the $\Delta RA$ of pure Ag. In general, the Ag—Sn alloy has a sufficient spin-diffusion length for a spacer layer that is thicker than 20 Å. Preferably, the spacer layer 204 thickness is approximately 20-45 Å.

Figure 6B:
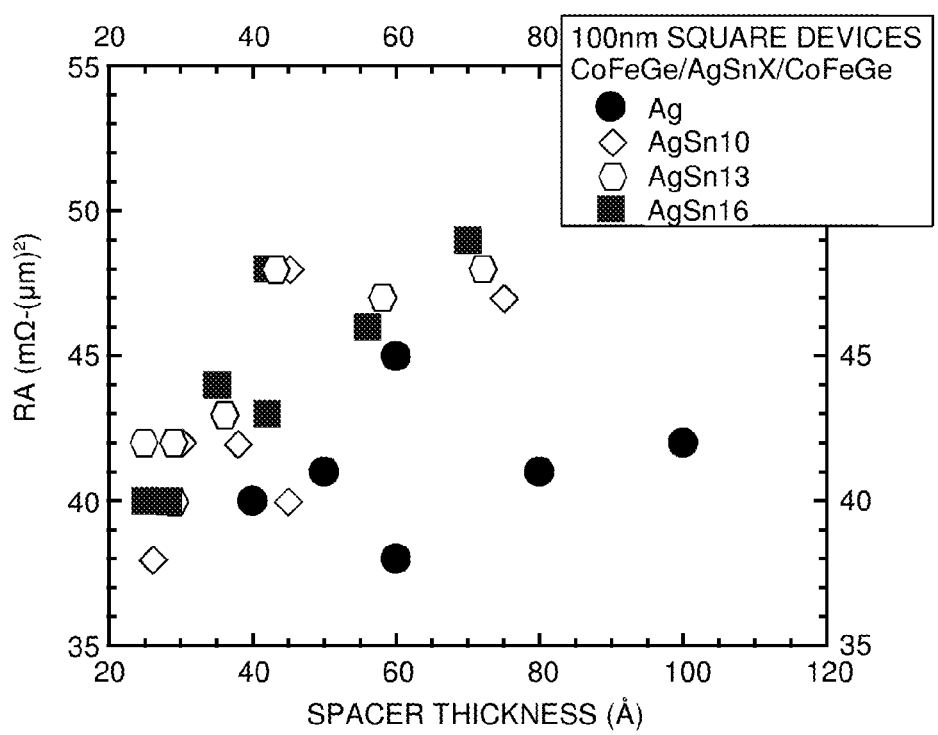

FIG. 6B is a graph showing the increase in device resistance due to increase in spacer resistivity over a range of spacer thicknesses. Devices containing Ag—Sn spacers show larger resistivity (slope of $\Delta RA$ versus spacer thickness) than devices containing Ag spacers. In the 25-40 Å spacer thickness range, the GMR signal is roughly the same for Ag and Ag—Sn devices. The decrease in $\Delta R/R$ for Ag—Sn spacers shows the spin diffusion length of Ag—Sn is smaller than that of Ag, but still greater than a typical device spacer thickness. In addition, due to interfacial roughness, Ag spacers are limited in thickness to around 35 Å while Ag—Sn spacers are much smoother and can be as thin as 25 Å without causing detrimental magnetic coupling between electrodes.

Figure 6C:
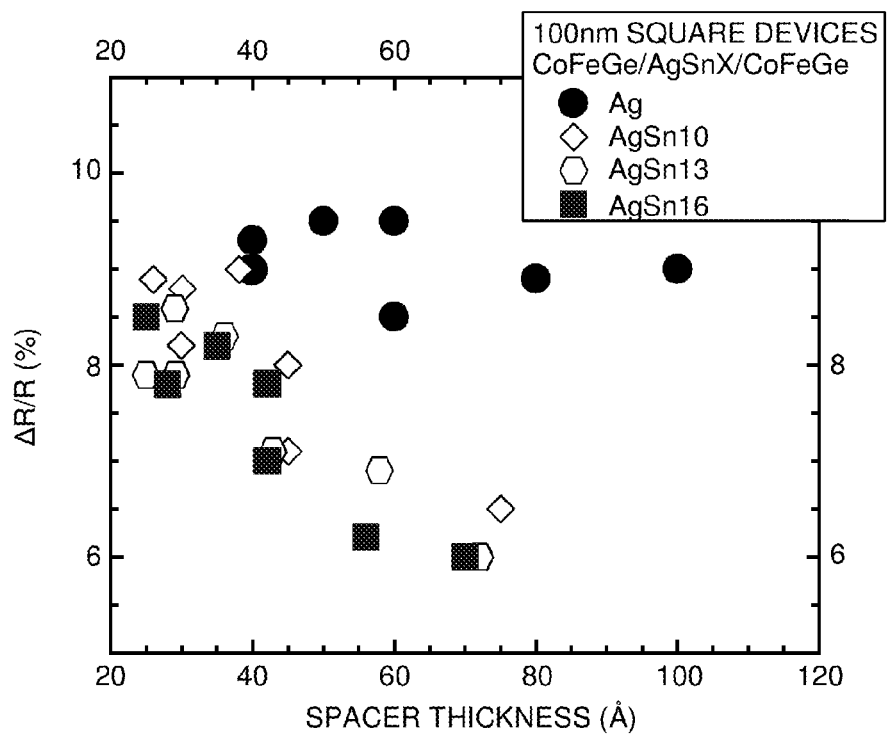

FIG. 6C is a graph showing an increase in device resistance due to increase in spacer resistivity over a range of spacer thicknesses. Devices containing Ag—Sn spacers show larger resistivity (slope of $\Delta RA$ versus spacer thickness) than devices containing Ag spacers.

Figure 6D:
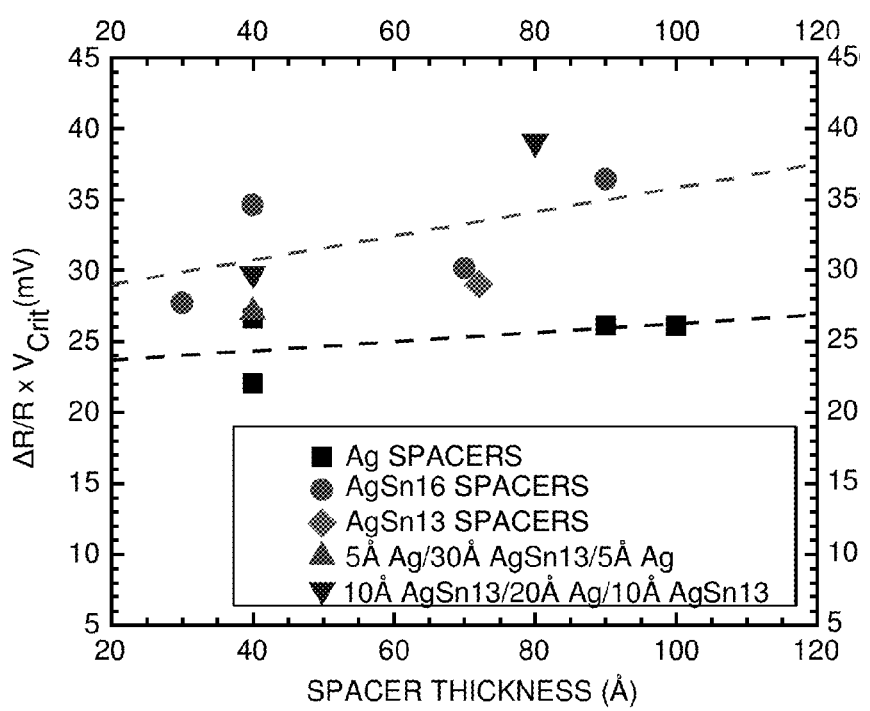

FIG. 6D is a graph illustrating spin torque data for various CPP-GMR sensors utilizing Ag, Ag—Sn, or multilayer Ag/Ag—Sn spacers. This data shows the behavior of the MR ($\Delta R/R$) times the critical voltage that results in spin torque instability in the reference layer as a function of the spacer thickness ($V_{crit}=J_{crit} \times RA$) for different materials of the space layer 204. The $\Delta R/R \times V_{crit}$ is higher for read sensors that contain an Ag—Sn spacer layer 204 than sensors containing a Ag spacer layer 204.

In one embodiment, the spacer layer 204 may comprise of a Cu—Ge alloy where the resistivity ($\rho_{Cu-Ge}$) of the alloy is greater than the resistivity ($\rho_{Cu}$) of a spacer layer 204 consisting only of Cu. The spin diffusion length of a Cu—Ge alloy permits the spacer layer to be greater than 20 Å.

In one embodiment, the atomic percent of either Sn or Ge in a respective alloy is less than 10%. In another embodiment, the atomic percent of either Sn or Ge in a respective alloy is between 2-20%.

In general, any metallic alloy may be used as the spacer layer 204 so long as the resistivity of the spacer layer, and thus the GMR sensor 200, is increased relative to a spacer layer made up of only one of the metals in the metallic alloy, and as long as the spacer layer 204 and its interfaces to the magnetic layers 202, 206 do not excessively reduce the magnetoresistance effect in the spin-valve due to a short spin-diffusion length or interfacial spin scattering.

Method for Fabricating the GMR Sensor

Figure 7A:
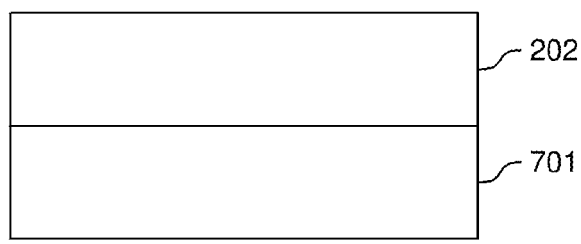
FIGS. 7A-C illustrate a method of fabricating a portion of a read head sensor, according to embodiments of the invention.
Figure 7B:
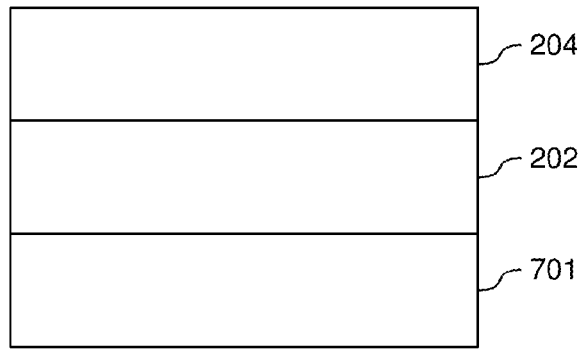
Figure 7C:
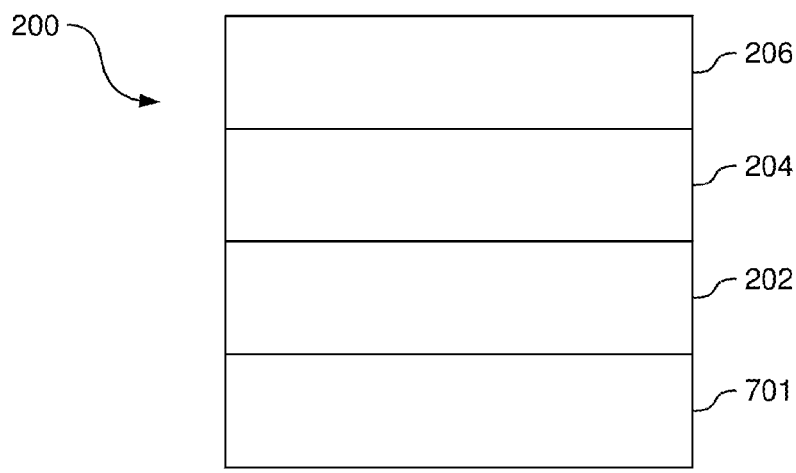

FIGS. 7A-C illustrate a method of fabricating a GMR sensor. In FIG. 7A, the ferromagnetic reference layer 202 is deposited above and the substrate 701. The substrate 701 may comprise of a plurality of other layers that are useful when manufacturing a CPP-GMR read head, such as layers of nickel-iron (NiFe), Tantalum (Ta), Ruthenium (Ru), Cobalt-Iron (CoFe), or any other magnetic or non-magnetic underlayers that serve to improve the crystalline structure or properties of the sensor.

In one embodiment, the ferromagnetic reference layer 202 is a Heusler alloy that comprises of multiple elements. Each element may be either deposited by a physical vapor deposition (PVD) method that uses a separate target for each element of the Heusler alloy or by a single target that contains all the elements of the Heusler alloy.

In FIG. 7B, the spacer layer 204 is deposited above the ferromagnetic reference layer 202. The spacer layer 204 may comprise of a metallic alloy that includes at least one electrically conducting metal such as Ag or Cu. The metallic alloy may also include at least one impurity—e.g., Sn or Ge—that increases the corrosion resistance and electrical resistivity of the spacer layer 204 relative to those characteristics without the impurity. A PVD method may sputter on the conducting metal and the impurity from individual targets or from a single target that contains both the metal and the impurity.

In one embodiment, the spacer layer directly contacts the ferromagnetic reference layer 202.

In FIG. 7C, the ferromagnetic free layer 206 is deposited above the spacer layer 204. In one embodiment, the ferromagnetic reference layer 202 is a Heusler alloy that comprises of multiple elements. Each element may be either deposited by a PVD method that uses a separate target for each element of the Heusler alloy or by a single target that contains all the elements of the Heusler alloy. Further, other layers may then be deposited on the substrate to finish the fabrication of the CPP-GMR sensor head.

In one embodiment, the layers 202, 204, and 206 are amorphous and do not share the same crystalline structure. In another embodiment, one or more of the layers 202, 204, and 206 are crystalline and may share the same ordered crystalline structure of a different layer.

In one embodiment, the ferromagnetic reference layer 202, spacer layer 204, and ferromagnetic free layer 206 may not be directly contacting but have other layers deposited between.

EXAMPLE EMBODIMENTS

Figure 8A:
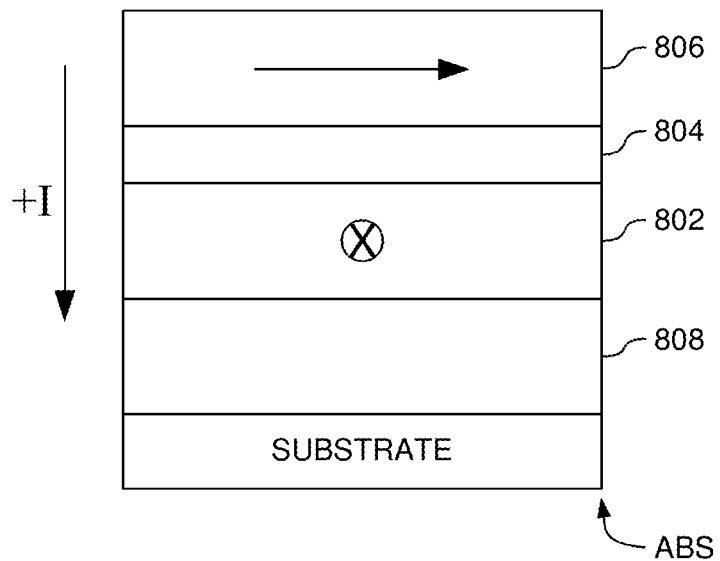
FIGS. 8A-C illustrate the structure of a read sensor, according to embodiments of the invention.
Figure 8B:
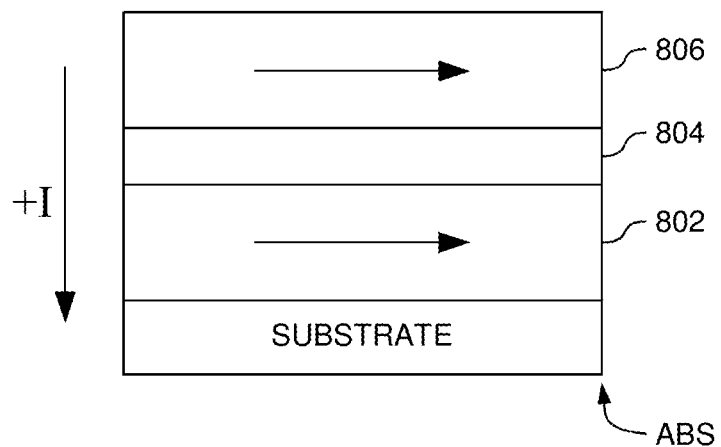
Figure 8C:
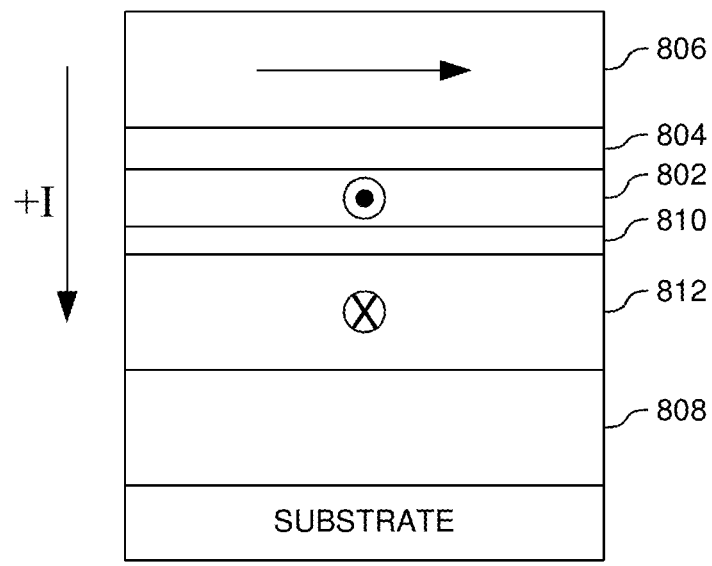

FIGS. 8A-C illustrate different read sensors, according to embodiments of the invention. FIG. 8A shows one embodiment of a read sensor that contains a CPP spin valve. A typical CPP-GMR spin valve is formed with a ferromagnetic free layer 806, a spacer layer 804, a pinned ferromagnetic reference layer 802, and an anti-ferromagnetic pinning layer 808. The ferromagnetic free layer 806 may comprise of the same material(s) that are suitable for the ferromagnetic reference layer 802. The ferromagnetic layers 802, 806 may comprise of the same material(s), or they may comprise a different single layer or multi-layer of alloys of, for example, Co, Fe and Ni.

FIG. 8B illustrates a pseudo spin valve where the ferromagnetic reference layer 802 is not pinned to an anti-ferromagnetic pinning layer.

FIG. 8C shows an "AP-pinned" spin valve where a pinned ferromagnetic layer 812 is exchange coupled to anti-ferromagnetic pinning layer 808, and is also anti-ferromagnetically coupled to the ferromagnetic reference layer 802 through a thin, anti-ferromagnetic coupling layer 810. The anti-ferromagnetic coupling layer 810 may comprise of material(s) that are suitable for anti-parallel coupling (e.g., Ru). The anti-ferromagnetic coupling layer 810 couples the pinned layer 812 and reference layer 802 such that their respective magnetizations are anti-parallel to each other and both at approximately 90 degrees relative to the magnetization of the ferromagnetic free layer 806.

Figure 9:
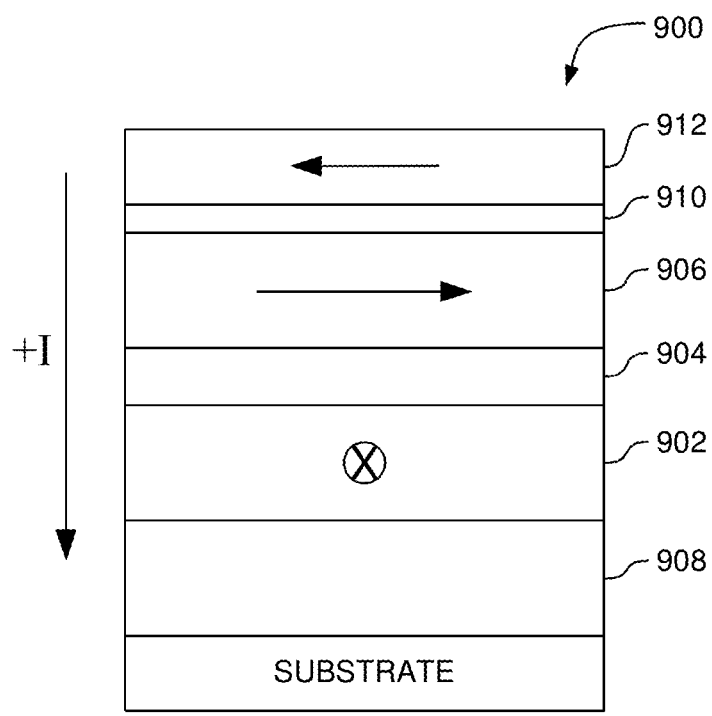
FIG. 9 illustrates the structure of a read sensor, according to one embodiment of the invention.

FIG. 9 illustrates a read head sensor with high resistivity, corrosion resistant spacer layer 904, according to embodiments of the invention. As shown, FIG. 9 shows an "AP free layer" where two ferromagnetic free layers (i.e., a first ferromagnetic free layer 906 and a second ferromagnetic free layer 912) are magnetically coupled, via the anti-ferromagnetic coupling layer 910 to one another such that their magnetizations are anti-parallel. Moreover, the magnetizations of the layers 906, 912 are oriented approximately 90 degrees from the magnetization of the ferromagnetic reference layer 902. In one embodiment, the magnetization of the ferromagnetic reference layer 902 is pinned by the anti-ferromagnetic layer 908. The anti-parallel coupled free layer 912 is able to provide increased immunity to spin-torque instability of the first ferromagnetic free-layer 906 when oriented primarily parallel to the reference layer, and thus is complimentary to the enhanced spin-torque stability of the anti-parallel state provided by the high resistivity spacer layer 904.

In the Figures, other layers may be deposited between the layers forming the read head sensors. Moreover, each layer may comprise different materials or a plurality of layers.

While the foregoing is directed to embodiments of the present invention, other and further embodiments of the invention may be devised without departing from the basic scope thereof, and the scope thereof is determined by the claims that follow.

What is claimed is:

1. A read head sensor, comprising:
 a first magnetic layer and a second magnetic layer; and
 a spacer layer disposed between the first and second magnetic layer, the spacer layer including a material selected from the group consisting of $AgSn_6$, $AgSn_{10}$, $AgSn_{13}$, and $AgSn_{16}$,
 wherein an electrical resistivity of the spacer layer is equal to or greater than 30 μΩ-cm.

2. The read head sensor of claim 1, wherein both the first and second magnetic layers comprise Heusler alloys.

3. The read head sensor of claim 1, wherein the thickness of the spacer layer is between 20 to 50 angstroms.

4. A read head sensor, comprising:
 a first magnetic layer and a second magnetic layer; and
 a spacer layer disposed between the first and second magnetic layer, wherein the spacer layer includes a material selected from the group consisting of $AgSn_6$, $AgSn_{10}$, $AgSn_{13}$, and $AgSn_{16}$.

5. The read head sensor of claim 4, wherein the thickness of the spacer layer is between 20 to 50 angstroms.

6. The read head sensor of claim 4, wherein the electrical resistivity of the spacer layer is greater than 30 μΩ-cm.

* * * * *